United States Patent
Hosoi et al.

(10) Patent No.: US 11,028,353 B2
(45) Date of Patent: Jun. 8, 2021

(54) METHOD FOR REMOVING UNWANTED COMPONENT INCLUDED IN BEVERAGE

(71) Applicants: THE NIKKA WHISKY DISTILLING CO., LTD., Tokyo (JP); Idemitsu Kosan Co., Ltd., Tokyo (JP)

(72) Inventors: Kenji Hosoi, Kashiwa (JP); Toshikazu Sugimoto, Moriya (JP); Akira Asahi, Kashiwa (JP); Yoshimi Kawashima, Ichihara (JP); Mitsuko Murata, Chiba (JP); Shun Fukasawa, Chiba (JP)

(73) Assignees: THE NIKKA WHISKY DISTILLING CO., LTD., Tokyo (JP); Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 15/106,924

(22) PCT Filed: Dec. 19, 2014

(86) PCT No.: PCT/JP2014/083752
§ 371 (c)(1),
(2) Date: Jun. 21, 2016

(87) PCT Pub. No.: WO2015/098762
PCT Pub. Date: Jul. 2, 2015

(65) Prior Publication Data
US 2017/0037347 A1     Feb. 9, 2017

(30) Foreign Application Priority Data
Dec. 25, 2013 (JP) .............. JP2013-266873

(51) Int. Cl.
C12H 1/044     (2006.01)
C12H 1/07      (2006.01)
C12H 1/22      (2006.01)

(52) U.S. Cl.
CPC .......... *C12H 1/0408* (2013.01); *C12H 1/063* (2013.01); *C12H 1/22* (2013.01)

(58) Field of Classification Search
USPC ............................................. 426/271, 330.4
See application file for complete search history.

(56) References Cited

U.S. PATENT DOCUMENTS

| 4,508,742 A | 4/1985 | McLaughlin et al. |
| 5,308,631 A | 5/1994 | Anglerot |
| 5,612,522 A | 3/1997 | Levy |

(Continued)

FOREIGN PATENT DOCUMENTS

| CN | 86 1 07014 A | 5/1988 |
| CN | 103031243 A | 4/2013 |

(Continued)

OTHER PUBLICATIONS

Submission Brief of Publications submitted Apr. 14, 2017 by a third party in counterpart Japanese Application No. 2015-554839.

(Continued)

*Primary Examiner* — Lien T Tran
(74) *Attorney, Agent, or Firm* — Sughrue Mion, PLLC

(57) ABSTRACT

A method and device for efficiently removing an unwanted component included in a beverage, which includes bringing the beverage into contact with a metal-supported zeolite.

11 Claims, 1 Drawing Sheet

(56) References Cited

U.S. PATENT DOCUMENTS

| | | | | |
|---|---|---|---|---|
| 5,744,183 | A | * | 4/1998 | Ellsworth ............ C12H 1/0408 |
| | | | | 426/330.4 |
| 8,062,597 | B2 | * | 11/2011 | Kim ..................... G01N 31/229 |
| | | | | 422/119 |
| 2005/0181931 | A1 | | 8/2005 | Mouri et al. |
| 2007/0028773 | A1 | * | 2/2007 | Jain ........................ B01D 53/02 |
| | | | | 95/135 |
| 2007/0167530 | A1 | | 7/2007 | Gerlach et al. |
| 2007/0298128 | A1 | | 12/2007 | Kurihara et al. |

FOREIGN PATENT DOCUMENTS

| | | | |
|---|---|---|---|
| GB | 2 298 858 | A | 9/1996 |
| JP | 55-144879 | A | 11/1980 |
| JP | 60-16584 | A | 1/1985 |
| JP | 63-116685 | A | 5/1988 |
| JP | 63-137668 | A | 6/1988 |
| JP | 64-005481 | A | 1/1989 |
| JP | 03-187374 | A | 8/1991 |
| JP | 10-095612 | A | 4/1998 |
| JP | 2001-278715 | A | 10/2001 |
| JP | 2004-168648 | A | 6/2004 |
| JP | 2004-222567 | A | 8/2004 |
| JP | 2007-515448 | A | 6/2007 |
| JP | 2008-001557 | A | 1/2008 |
| JP | 2009-106829 | A | 5/2009 |
| JP | 2011-020072 | A | 2/2011 |
| JP | 2012-016321 | A | 1/2012 |
| JP | 2012-206060 | A | 10/2012 |
| JP | 2014-124129 | A | 7/2014 |
| JP | 2014-124130 | A | 7/2014 |

OTHER PUBLICATIONS

Ajico news: Information Magazine on Food and Health, Website of National Diet Library, searched on Apr. 14, 2017, http://iss.ndl.go.jp/books/R1000000002-I000000101606-00; 1 page total.

Ajico News 199, searched on Apr. 14, 2017, published by Mar. 2006, http://shokoagri.com/tech/11/11-40.pdf; 8 pages total.

Communication dated Jul. 3, 2017, from the European Patent Office in counterpart European application No. 14874221.6.

Communication dated Mar. 28, 2018 from the European Patent Office in counterpart Application No. 14 874 221.6.

Japanese Office Action (Notification of Reasons for Refusal) dated Jan. 18, 2018 for corresponding Japanese Patent Application No. 2015-554839.

International Preliminary Report on Patentability and Written Opinion, dated Jul. 7, 2016, issued by the International Searching Authority in corresponding International Application No. PCT/JP2014/083752.

Translation of Yasuo Karihara, "Application of antibacterial agent in the field of beverage", Beverage Japan, 2001, vol. 24, No. 1, p. 47,48 (previously submitted Jun. 21, 2016).

Communication dated Sep. 20, 2018, from the European Patent Office in counterpart European Application No. 14874221.6.

Communication dated Oct. 30, 2018, issued by the Japanese Patent Office in counterpart application No. 2017-236255.

Masahiro Masuda and Ki-I-Chi Nishimura; "Changes in Volatile Sulfur Compounds of Whisky During Aging"; Journal of Food Science; vol. 47 (1981); pp. 101-105.

Inge Russell and Graham Stewart; "Whisky: Technology, Production and Marketing"; Elsevier; 2014.

Communication dated Mar. 8, 2019 by the European Patent Office in Application No. 14 874 221.6.

Translation of Chinese Publication No. 86107014 published May 18, 1988.

Notice of Reasons for Refusal dated Jun. 25, 2019 issued by the Japanese Patent Office in counterpart application No. 2017-236255.

Communication dated Jan. 21, 2020, from the Japanese Patent Office in counterpart application No. 2017-236255.

Communication dated Jan. 21, 2020, from the Indian Patent Office in counterpart application No. 201647021569.

Communication dated Dec. 18, 2019, from the European Patent Office in counterpart application No. 14 874 221.6.

Submissions for publications submitted Jan. 15, 2021 by a third party to the Japanese Patent Office in JP Application No. 2020-075549.

Notification of Submissions for publications dated Feb. 24, 2021 from the Japanese Patent Office in JP Application No. 2020-075549.

Yasuo Kurihara, "Application of antibacterial agent in the field of beverage", Beverage Japan, 2001, pp. 47-48, vol. 24, No. 1.

International Search Report of PCT/JP2014/083752 dated Mar. 10, 2015.

* cited by examiner

METHOD FOR REMOVING UNWANTED COMPONENT INCLUDED IN BEVERAGE

CROSS REFERENCE TO RELATED APPLICATIONS

This application is a National Stage of International Application No. PCT/JP2014/083752 filed Dec. 19, 2014, claiming priority based on Japanese Patent Application No. 2013-266873, filed Dec. 25, 2013, the contents of all of which are incorporated herein by reference in their entirety.

TECHNICAL FIELD

The present invention relates to a method and device for removing an unwanted component included in a beverage, and in particular, it relates to a method and device for removing an unwanted component included in a beverage using a metal-supported zeolite.

BACKGROUND ART

Distilled alcoholic beverages typified by whisky, Shochu and the like are the alcoholic beverages, which are produced by obtaining a fermented liquid by alcoholic fermentation with yeast of raw materials, such as grains and fruits, and distilling the fermented liquid in a distillation process. Since the distillate immediately after distillation (new make spirits) contains a lot of unwanted components accompanied by an unpleasant smell, it is usually shipped after the unwanted components are reduced by storage for a certain period, agitation and the like.

For example, in case of whisky, it is stored and matured for 4-6 years for the shortest, and for nearly 20 years for the longest, so that, during storage, evaporation and disappearance of unstored components such as sulfur compounds, reactions of components derived from new make spirits (oxidation reaction, acetalization reaction, esterification reaction and the like), degradation reactions of components derived from raw material of barrels, reactions of components derived from the raw material, which are eluted inside of the barrels, and raw whisky, a change in state of ethanol and water that constitute raw whisky and the like occur, whereby a flavor unique to whisky is brought out.

As described above, the long-term storage and maturation decrease the production efficiency of whisky and the like, and increase the production cost. Thus it is difficult to inexpensively provide consumers with whisky with a good flavor or the like.

So it is considered a method for removing unwanted components for alcoholic beverages such as unstored components including sulfur compounds, precipitated components during a cold season, an unpleasant smell and the like in an active manner without waiting for a change that naturally occurs by storage.

As a method for removing an unwanted component from alcoholic beverages, for example, a method of bringing alcoholic beverages into contact with an absorbent obtained by treating silica with an organic silane compound (refer to Patent Document 1), a method of bringing alcoholic beverages into contact with activated carbon (refer to Patent Document 2), a method using an ion-exchange resin (refer to Patent Document 3), a method using metal grains and a resin layer (refer to Patent Document 4), and the like are already proposed.

However, in the above conventional technologies, there was still room left to provide a product satisfying a demand for higher quality.

BACKGROUND ART DOCUMENTS

Patent Documents

Patent Document 1: JP S63-137668 A
Patent Document 2: JP H03-187374 A
Patent Document 3: JP 2004-222567 A
Patent Document 4: JP 2012-016321 A

SUMMARY OF THE INVENTION

Problem to be Solved by the Invention

The present invention solves the above conventional problem, and an object thereof is to provide a method and device for removing an unwanted component included in a beverage with high removal efficiency of the unwanted component, while leaving a flavor inherent in the beverage.

Means for Solving the Problem

The present invention provides a method for removing an unwanted component included in a beverage, comprising: bringing the beverage into contact with a metal-supported zeolite.

In one embodiment, a metal which constitutes the metal-supported zeolite is silver.

In one embodiment, a zeolite which constitutes the metal-supported zeolite is Y-type or β-type.

In one embodiment, the metal is supported in an amount of 5 mass % or more and 25 mass % or less based on a total amount of the metal-supported zeolite.

Furthermore, the present invention provides a method for removing an unwanted component included in a beverage, comprising:
bringing the beverage into contact with a metal-supported zeolite; and
bringing the beverage, which has been brought into contact with the metal-supported zeolite, into contact with a metal-trapping material.

In one embodiment, the metal-trapping material is a zeolite.

In one embodiment, the zeolite as the metal-trapping material traps the metal eluted from the metal-supported zeolite, and also removes the unwanted component included in the beverage.

In one embodiment, the zeolite as the metal-trapping material is Na-type zeolite.

Furthermore, the present invention provides a device for removing an unwanted component included in a beverage, comprising means for bringing the beverage into contact with a metal-supported zeolite.

Furthermore, the present invention provides a device for removing an unwanted component included in a beverage, comprising:
means for bringing the beverage into contact with a metal-supported zeolite; and
means for bringing the beverage, which has been brought into contact with the metal-supported zeolite, into contact with a metal-trapping material.

In one embodiment, a zeolite as the metal-trapping material traps the metal eluted from the metal-supported zeolite, and also removes an unwanted component included in the beverage.

In one embodiment, the zeolite as the metal-trapping material is Na-type zeolite.

Effect of the Invention

According to the method and device of the present invention, an unwanted component included in a beverage is efficiently removed while leaving a flavor inherent in the beverage.

DESCRIPTION OF EMBODIMENTS

[Beverage]

Figure 1:
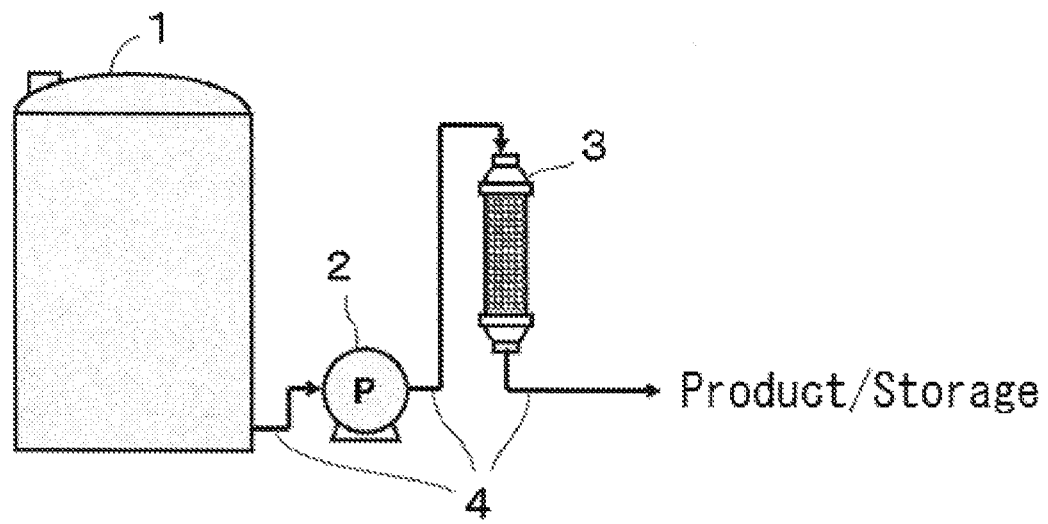
FIG. 1 is a schematic diagram showing the configuration of a device for removing an unwanted component included in a beverage according to the present invention.

The beverage to be treated by the method and device of the present invention is not particularly limited as long as it includes an unwanted component that disturbs a flavor inherent in the beverage. In general, such beverages are alcoholic beverages. The alcoholic beverages are not particularly limited, and all alcoholic beverages can be applied. Specifically, all distilled alcoholic beverages such as whisky, brandy, gin, vodka, tequila, rum, white liquor, and arrack can be applied. Also, all brewed alcoholic beverages and mixed liquors such as sake, beer, wine, fortified wine and a Chinese liquor can be applied. Among the brewed alcoholic beverages and mixed liquors, sake is preferably used. Furthermore, all shochus such as barley shochu, rice shochu, sweet potato shochu, kokutoshu, buckwheat shochu, corn shochu, shochu made from sake lees and awamori can be applied.

The unwanted component is a component that disturbs the flavor of alcoholic beverages, and mainly includes unpalatable components. Examples of the unpalatable components include sulfur compounds such as dimethyl sulfide (DMS), dimethyl disulfide (DMDS), dimethyl trisulfide (DMTS), and the like. Also, they include nitrogen compounds such as pyridine.

Among the sulfur compounds, dimethyl sulfide (DMS), dimethyl disulfide (DMDS), dimethyl trisulfide (DMTS) are known as substances having an immature smell included in whisky. In general, they are evaporated or oxidized during maturation in barrels so that their concentrations are lowered below sensory threshold values.

Among the above alcoholic beverages, since the distilled alcoholic beverages, in particular, whisky, shochu, brandy, gin, vodka, tequila, rum, white liquor, arrack and the like include sulfur compounds as the unpalatable components that disturb the flavor of alcoholic beverages, they are preferred as the beverages to be treated by the method and device of the present invention. The most preferred alcoholic beverages to be treated by the method and device of the present invention include whisky.

The method and device of the present invention can leave flavor and aroma components such as higher alcohols, fusels, and esters included in the alcoholic beverages, while removing the above unwanted components included in the alcoholic beverages.

[Metal-Supported Zeolite]

The metal-supported zeolite to be used in the present invention is a zeolite on which a metal is supported. The supported metal is preferably silver. The metal-supported zeolite is preferably at least one selected from β-type and Y-type. The particularly preferable zeolite is Y-type.

More specifically, the zeolites are preferably FAU- and BEA-structured zeolites with 12- or 10-membered ring pores.

The zeolite preferably has a BET surface area of 500 ($m^2/g$) or more and 900 ($m^2/g$), and more preferably 550 ($m^2/g$) or more and 850 ($m^2/g$) or less. The zeolite preferably has a micropore volume of 0.05 (cc/g) or more and 0.40 (cc/g) or less, and more preferably, 0.10 (cc/g) or more and 0.35 (cc/g).

As a method for producing a metal-supported zeolite, an ion-exchange method is given. In the ion-exchange method, metal ions are made to be supported inside the zeolite crystals by ion exchange. The metal ions preferably include silver ions.

As a method for supporting metal ions inside the zeolite crystals by exchanging internal ions of the zeolite crystals with the metal ions, a method is given in which a zeolite is put in a solution containing metal ions so that the solution containing the metal ions is brought into contact with the zeolite at a temperature of about ambient temperature to 80° C. for one to several hours. This operation may be repeatedly performed a plurality of times.

Water-soluble metal salts such as nitrates and chlorides can be used as the solution containing the metal ions. Furthermore, a solution in which a metal compound is dissolved in aqueous ammonia to prepare metal-ammine complex ions can also be used. That is, silver nitrate, and ammonium nitrate can be used.

After the metal ions have been supported inside the zeolite crystals by ion exchange, the resultant zeolite is washed with water or the like. Thereafter, it may be subjected to a drying treatment at a temperature of about 50° C. or more, preferably at 50° C. or more and 200° C. or less. Furthermore, after dried, it may further be subjected to calcination treatment at a temperature of about 500° C. or less, preferably at 200° C. or more and 500° C. or less, for several hours.

A total amount of the metal supported on the zeolite is preferably 5 mass % or more and 25 mass % or less, more preferably 5 mass % or more and 20 mass % or less, further % % preferably 6 mass % or more and 20 mass % or less, and most % % preferably 6 mass or more and 18 mass or less, based on % % a total amount of the metal-supported zeolite. When the amount of the metal supported is less than 5 mass %, removal efficiency of an unwanted component included in a beverage decreases. When it exceeds 25 mass %, since metal ion exchange hardly occurs, the metal is liable to aggregates, resulting in an increase in the amount of the metal eluted into the beverage.

In another embodiment, the total amount of the metal supported on the zeolite is preferably 7 mass % or more and 23 mass % or less, more preferably 10 mass % or more and 20 mass % or less, and most preferably 12 mass % or more and 18 mass % or less, based on the total amount of the metal-supported zeolite.

The metal-supported zeolite may be shaped by adding a binder component. The binder component is preferably added in a ratio of 5 mass % or more and 50 mass % or less, more preferably 10 mass % or more and 30 mass % or less, based on a total amount of the metal-supported zeolite shaped product.

The zeolite shaped product preferably has an average particle size of 0.1 mm or more and 5 mm or less, more preferably 0.3 mm or more and 3 mm or less, and further preferably 0.5 mm or more and 2 mm or less.

In another embodiment, the zeolite shaped product preferably has an average particle size of 0.4 mm or more and 1.3 mm or less. The metal-supported zeolite in small particle size tends to easily adsorb an unwanted component in a beverage. Therefore, the average particle size of the zeolite shaped product is preferably small as long as it does not prevent its uniform contact with the beverage.

Usable binder components preferably include alumina, silica and the like. From the viewpoint of facilitating shaping, clay minerals such as bentonite and vermiculite, and organic additives such as cellulose may further be added. A metal-supported zeolite shaped product can be obtained by adding the above binder components to the zeolite, followed by a usual method including extrusion shaping, tableted forming, rolling granulation, and spray drying.

[Contact Between Beverage and Metal-Supported Zeolite]

Contact between the beverage and the metal-supported zeolite is generally performed by immersing the metal-supported zeolite in the beverage. For example, the beverage may be brought into contact with the metal-supported zeolite in an embodiment in which the beverage and the metal-supported zeolite are put in the same container, or in an embodiment in which the beverage is passed through a column filled with the metal-supported zeolite.

Although the temperature at which the beverage is brought into contact with the metal-supported zeolite is usually room temperature (namely, about 25° C.), the contact may be performed under heating or cooling, if necessary. When the beverage is passed through the column filled with the metal-supported zeolite, its flow rate (LHSV) range is 0.1-100 $h^{-1}$, preferably 0.5-50 $h^{-1}$, and more preferably 1-30 $h^{-1}$.

The temperature at which the beverage is brought into contact with the metal-supported zeolite is generally 5° C. or more and 60° C. or less, preferably 10° C. or more and 40° C. or less, and more preferably 20° C. or more and 40° C. or less. The metal-supported zeolite easily adsorbs the unwanted component in the beverage under a high temperature environment, and tends to prevent a metal from easily being eluted. It is preferred that the temperature at which the beverage is brought into contact with the metal-supported zeolite is higher than room temperature.

When the beverage is brought into contact with the metal-supported zeolite, the metal supported on the metal-supported zeolite is sometimes eluted into the beverage. A metal elution amount increases in proportion to the amount of the metal supported on the zeolite. In order to increase removal efficiency of the unwanted component, it is necessary to increase the amount of the metal supported on the zeolite. On the other hand, it is preferred that a metal eluted into the beverage is removed from the viewpoint of safety to a human body. Therefore, it is preferred that the beverage, which has been brought into contact with the metal-supported zeolite, is then brought into contact with a metal-trapping material. The beverage, which has been brought into contact with the metal-supported zeolite, is brought into contact with the metal-trapping material, whereby the metal eluted from the metal-supported zeolite is removed.

Publicly known chelate resins, ion-exchange resins, zeolites and the like can be used as the metal-trapping materials. The metal-trapping materials include zeolites having ion-exchangeable cations, and, in particular, zeolites having any one structure from among faujasite, X-type zeolite, Y-type zeolite, A-type zeolite, ZSM-5 zeolite, mordenite, and β-type zeolite.

The zeolite for the metal-trapping material is preferably Na-type zeolite or H-type zeolite, which has, as an ion exchangeable cation, $Na^+$ or $H^+$.

The most preferred zeolite includes Y-type zeolite, and NaY-type zeolite having $Na^+$ as an ion-exchangeable cation.

The zeolite has high capability of trapping a metal eluted from the metal-supported zeolite, and has a long effective life as the metal-trapping material. Also, using the zeolite as the metal-trapping material can selectively adsorb only a specific sulfur compound "while leaving flavor and aroma components of an alcoholic beverage".

It is considered that, as a result that the zeolite for the metal-trapping material has trapped the metal, the zeolite for the metal-trapping material functions similarly to the metal-supported zeolite, and also removes the unwanted component included in the beverage. Consequently, when the zeolite is used as the metal-trapping material, the effect is obtained that the life of the function of the metal-supported zeolite, i.e., removing the unwanted component in the beverage, is extended.

When the zeolite is used as the metal-trapping material, its amount used is 0.3-3.0, preferably 0.6-2.0, and more preferably 1.0-1.5 in a volume ratio based on the metal-supported zeolite. When the amount of the zeolite used is in a volume ratio of less than 0.3 based on the metal-supported zeolite, the metal is eluted into the alcoholic beverage before the adsorption capacity of the metal-supported zeolite is consumed. When the amount used exceeds 3.0, the metal-trapping capacity is sufficient, but this leads to deterioration of the operational efficiency of the device including economic efficiency.

[Device]

FIG. 1 is a schematic diagram illustrating the configuration of a device for removing an unwanted component included in a beverage according to the present invention. This device is provided with a beverage tank 1, a pump 2, and a cartridge column 3, and they are connected by lines 4. A beverage is stored in the beverage tank 1 after being produced, and sent to the cartridge column 3 by the pump 2 through the lines 4. The cartridge column 3 is uniformly filled with a metal-supported zeolite. The beverage having passed through the cartridge column 3 is stored as a product.

The plural cartridge columns 3 may be placed linearly or in parallel. In one preferred embodiment, the two cartridge columns 2 are placed linearly or in parallel, the cartridge column through which the beverage first passes is filled with the metal-supported zeolite, and the cartridge column through which the beverage passes next is filled with a metal-trapping material.

Figure 2:
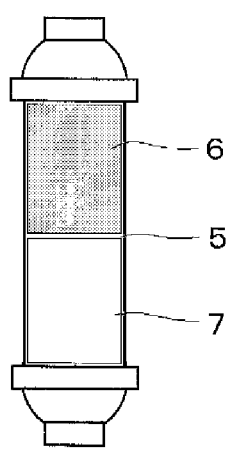
FIG. 2 is a cross sectional view showing one embodiment of a cartridge column used in the device according to the present invention.

FIG. 2 is s cross sectional view showing one embodiment of the cartridge column used in the device of the present invention. The inside of the cartridge column is divided into two chambers by a filter 5. A chamber 6 on the inflow port side of the beverage is filled with the metal-supported zeolite, and a chamber 7 on the outflow port side of the beverage is filled with the metal-trapping material. The filter 5 setup may be omitted by directly layering the metal-trapping material and the metal-supported zeolite in the cartridge column.

EXAMPLES

The present invention will hereinafter be described more specifically by Examples. It should not be construed that the present invention is limited to the following Examples.

Example 1

A commercially available NaY-type zeolite shaped product (manufactured by TOSOH CORPORATION, "HSZ- 320NAD1A") was crushed to have an average particle size of 0.5-1 mm. Ammonium nitrate (240 g) was dissolved in water (3 L), and the zeolite (1 kg) was put thereinto. The liquid was stirred for 3 hours, and subjected to ion exchange treatment to obtain $NH_4$Y-type zeolite. After water washing and drying, the $NH_4$Y-type zeolite (1 kg) was put into an aqueous solution of silver ammine complex ion obtained by dissolving silver nitrate (394 g) and ammonia (30%) (330 g) in water (2.5 L). The liquid was stirred for 3 hours, silver ion exchange was performed, and further water washing and drying were performed. Thereafter, calcination was performed at 400° C. for 3 hours to obtain granulated AgY-type zeolite. The supported silver amount of the obtained AgY-type zeolite was 13.8 (mass %).

AgY-type zeolites with different supported silver amounts were produced in the same manner as above except that the amounts of silver nitrate and ammonia (30%) reacting with $NH_4$Y-type zeolite (1 kg) were changed as necessary.

To granules of the AgY-type zeolites, water was added to suspend them. After the suspensions were washed while removing floating matter, the suspensions were each put into a column container having a diameter of 1.0 cm to prepare a filling body having a height of 6.25 cm. Water (25 mL) was passed therethrough, and whisky (new make malt whisky (alcohol content: 62%)) (25 mL) was passed therethrough to prepare a column.

Concentrations of sulfur compounds (dimethyl sulfide (DMS), dimethyl disulfide (DMDS) and dimethyl trisulfide (DMTS)) in the whisky were measured by using a Headspace Gas Chromatograph Mass Spectrometer "6890N Type" manufactured by Agilent Technologies, Inc., and a headspace injector "MultiPurpose Sampler MPS2" manufactured by GERSTEL, Inc. In the whisky before the column treatment, dimethyl sulfide (DMS) (1.1902 ppm), dimethyl disulfide (DMDS) (0.5082 ppm), and dimethyl trisulfide (DMTS) (0.0045 ppm) were included.

This whisky was flown through the prepared column at room temperature at a liquid-passing rate of $SV=10\ h^{-1}$ to collect a liquid that has passed through (100 mL). Concentrations of the sulfur compounds in the liquid that has passed through were measured in the same manner as above. The sulfur compounds were represented with their removal rates. A removal rate of 100% demonstrates that the amount of presence after the test is less than a detectable level. The removal rates of the sulfur compounds by the column treatment are shown in Table 1.

Then, silver concentrations of the liquid that has passed through were measured by using an ICP emission spectrophotometer "720-ES" manufactured by Agilent Technologies, Inc. The results are shown in Table 1.

TABLE 1

| | | Supported silver amount (mass %) | | |
| --- | --- | --- | --- | --- |
| | | 13.8 | 6.5 | 3.5 |
| Removal rate of sulfur compound (%) | DMS | 100.0 | 97.9 | 95.9 |
| | DMDS | 81.9 | 18.1 | 0.0 |
| | DMTS | 100.0 | 17.4 | 0.0 |
| Ag concentration (ppm) | | 9.6 | 2.9 | 0.6 |

It was confirmed from the results of Table 1 that the sulfur compounds included in the whisky were removed in a specific manner by bringing it into contact with the AgY-type zeolite. Also, it was confirmed that silver was eluted into the whisky when it was brought into contact with the AgY-type zeolite.

Example 2

A commercially available NaY-type zeolite shaped product (manufactured by TOSOH CORPORATION, "HSZ-320NAD1A") was crushed to have an average particle size of 0.5-1 mm. Water was added to the granular NaY-type zeolite to suspend it. The resultant suspension was put into a column container having a diameter of 1.0 cm so that it was filled to a height of 6.25 cm with the NaY-type zeolite.

Water was added to AgY-type zeolite with a supported silver amount of 13.8 (mass %), which was prepared in the same manner as in Example 1, to suspend it. The resultant suspension was put into the column container filled with the NaY-type zeolite so that it was filled to a height of 6.25 cm with the AgY-type zeolite. Water (25 mL) was passed through the column container, and whisky (new make malt whisky (alcohol content: 62%)) was passed through the column container to prepare a column.

Using the column in which the NaY-type zeolite and the AgY-type zeolite were layered, whisky was treated in the same manner as in Example 1 except that the whisky was first passed through the AgY-type zeolite layer and then passed through the NaY-type zeolite layer. In the whisky before the column treatment, dimethyl sulfide (DMS) (1.1614 ppm), dimethyl disulfide (DMDS) (0.4759 ppm), and dimethyl trisulfide (DMTS) (0.0049 ppm) were included. Concentrations of the sulfur compounds in the liquid that has passed through were measured in the same manner as in Example 1. Removal rates of the sulfur compounds by the present column treatment are shown in Table 2.

Then, the silver concentration of the liquid that has passed through was measured in the same manner as above. The results are shown in Table 2.

TABLE 2

| | | Supported silver amount (mass %) 13.8 |
| --- | --- | --- |
| Removal rate of sulfur compound (%) | DMS | 100.0 |
| | DMDS | 98.9 |
| | DMTS | 100.0 |
| Ag concentration (ppm) | | less than 0.01 |

It was confirmed from the results of Table 2 that the sulfur compounds included in the whisky were removed in a specific manner by bringing it into contact with the AgY-type zeolite and that silver eluted from the AgY-type zeolite was also removed.

Example 3

AgY-type zeolites with different supported silver amounts and different particle sizes were prepared in the same manner as in Example 1. Water was added to each granular AgY-type zeolite to suspend it. The resultant suspension was put into a column container A having a diameter of 1.0 cm so that it was filled to a height of 23 cm with the AgY-type zeolite. Similarly, a column container B having a diameter of 1.0 cm was filled to a height of 23 cm with granular NaY-type zeolite. A valve for sampling the liquid halfway was installed between the column container A and the column container B to connect them with tubes made of polytetrafluoroethylene (Teflon (registered tradename)). As for the particle sizes, Q50% values corresponding to equivalent circle diameters were measured by using a CAMSIZER/ digital image analysis type particle size distribution meter (HORIBA, Ltd., Retsch Technology Gmbh).

Connecting the columns of the AgY-type zeolite and the NaY-type zeolite, whisky was first passed through the AgY-type zeolite layer, and then the Na-y-type zeolite layer at a predetermined flow rate. Except for this, the whisky was treated in the same manner as in Example 1. The temperature was adjusted to a predetermined temperature by immersing the column container A and the column container in a water bath. In the whisky before the column treatment, dimethyl sulfide (DMS) (0.35 ppm), dimethyl disulfide (DMDS) (0.22 ppm), and dimethyl trisulfide (DMTS) (0.0073 ppm) were included. Concentrations of the sulfur compounds in the liquid that has passed through were measured in the same manner as in Example 1. Removal rates of the sulfur compounds by the present column treatment are shown in Table 3.

Using the column in which the AgY-type zeolite and the NaY-type zeolite were layered, whisky was, at 35° C., first passed through the AgY-type zeolite layer, then through the NaY-type zeolite layer, and the whisky was subjected to liquid-passing treatment at an LHSV of 5 $hr^{-1}$ to the AgY-type zeolite. In the whisky before the column treatment, dimethyl sulfide (DMS) (1.79 ppm), dimethyl disulfide (DMDS) (0.31 ppm), and dimethyl trisulfide (DMTS) (0.0039 ppm) were included.

A liquid that has passed through the column container A and the liquid that has passed through the column contain B were sampled to measure sulfur and Ag concentrations. The results of 3 hours after, 580 hours after, and 1200 hours after the liquid-passing was started, are shown in Table 4.

TABLE 3

| | | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| LHSV | $h^{-1}$ | 5 | 20 | 20 | 20 | 20 | 20 | 20 | 20 | 20 | 20 |
| Supported silver amount | wt % | 12.8 | 12.8 | 13.2 | 15.6 | 17.1 | 13.2 | 13.2 | 13.2 | 14.6 | 14.6 |
| Temperature | ° C. | 30 | 30 | 20 | 23 | 20 | 5 | 40 | 60 | 20 | 20 |
| Particle size | mm | 1.28 | 1.28 | 1.14 | 1.14 | 1.14 | 1.28 | 1.28 | 1.28 | 0.44 | 1.77 |
| Ag concentration at outlet port of column A | ppm | 10 | 9 | 6 | 7 | 13 | 11 | 3 | 3 | 10 | 5 |
| DMS removal rate | % | 100 | 100 | 100 | 99 | 94 | 90 | 83 | 75 | 100 | 88 |
| DMDS removal rate | % | 100 | 47 | 42 | 58 | 71 | 21 | 61 | 57 | 79 | 38 |
| Ag concentration at outlet port of column B | ppm | <0.01 | <0.01 | <0.01 | <0.01 | <0.01 | <0.01 | <0.01 | <0.01 | <0.01 | <0.01 |

Example 4

A spherical shaped product of AgY-type zeolite with a supported silver amount of 16.0 (mass %) and an average particle size of 1.2 mm was prepared. Water was added to the granules to suspend them. The resultant suspension was put into a column container A having a diameter of 1.0 cm so that it was filled to a height of 50 cm with the AgY-type zeolite.

Similarly, water was added to a NaY-type zeolite shaped product with an average particle size of 1.2 mm so that it was suspended. The resultant suspension was put into a column container B having a diameter of 1.0 cm so that it was filled to a height of 50 cm with the NaY-type zeolite.

The column container A and the column container B were connected upstream and downstream, respectively. From the column container A, water (300 mL) was passed through, and whisky (new make malt whisky (alcohol content: 62%)) (300 mL) was passed through to prepare a column.

On a liquid-passing time of 580 hours, the DMDS removal rate at an outlet port of the column A became 88%, whereas the liquid-passing time required to achieve the same DMDS removal rate at an outlet port of the column B of 88% was 1200 hours. It was found that DMDS was absorbed by silver trapped by the NaY-type zeolite to extend its life.

TABLE 4

| | Liquid-passing time: 3 hours | | Liquid-passing time: 580 hours | | Liquid-passing time: 1200 hours | |
|---|---|---|---|---|---|---|
| | Column container A | Column container B | Column container A | Column container B | Column container A | Column container B |
| DMDS removal rate (%) | 100 | 100 | 88 | 96 | 28 | 88 |
| Ag concentration (ppm) | 11 | <0.01 | 8 | <0.01 | 3 | <0.01 |

Example 5

A spherical shaped product of AgY-type zeolite with a supported silver amount of 12.8 (mass %), and an average particle size of 1.2 mm was prepared. Water was added to the granules to suspend them. The resultant suspension was put into a column container A having a diameter of 2.3 cm so that it was filled to a height of 58 cm with the AgY-type zeolite.

Similarly, water was added to a NaY-type zeolite shaped product with an average particle size of 1.2 mm so that it was suspended. The resultant suspension was put into a column container B having a diameter of 2.3 cm so that it was filled to a height of 58 cm with the NaY-type zeolite.

The column container A and the column container B were connected upstream and downstream, respectively. From the column container A, water (1.2 L) was passed through, and whisky (new make malt whisky (alcohol content: 62%)) (1.2 L) was passed through to prepare a column.

Using the column in which the AgY-type zeolite and the NaY-type zeolite were layered, whisky was first passed through the AgY-type zeolite layer, then passed through the NaY-type zeolite layer, and whisky was subjected to liquid-passing treatment at room temperature at an LHSV of 2.5 $hr^{-1}$ to the AgY-type zeolite. In the whisky before the column treatment, dimethyl sulfide (DMS) (0.35 ppm), dimethyl disulfide (DMDS) (0.22 ppm), and dimethyl trisulfide (DMTS) (0.0073 ppm) were included.

Immediately after the liquid-passing was started, sampling was performed from the outlet of the column B to measure sulfur and Ag concentrations. The treated liquid was collected in three portions, i.e., start time of liquid-passing to 450 hours, 450 to 900 hours, and 900 to 1300 hours, to measure the sulfur and Ag concentrations according to the similar manner. The results are shown in Table 5.

TABLE 5

|  | Start time of liquid passing | Start time of liquid passing to 450 hours | 450 to 900 hours | 900 to 1300 hours |
| --- | --- | --- | --- | --- |
| DMDS removal rate (%) | 95 | 95 | 89 | 81 |
| Ag concentration (ppm) | <0.01 | <0.01 | <0.01 | <0.01 |

Example 6

The measurement results of compositions of flavor components of the whiskies subjected to the liquid-passing treatment in Example 5 and the untreated whisky are shown in Table 6. It was confirmed that there were no great changes in concentration of major flavor components due to the liquid-passing treatment.

TABLE 6

| | Flavor component concentration (ppm) | | | |
| --- | --- | --- | --- | --- |
| | Untreated | Start time of liquid passing to 450 hours | 450 to 900 hours | 900 to 1300 hours |
| Ethyl Lactate | 5.1 | 4.7 | 5.2 | 4.7 |
| furfural | 6.7 | 8.7 | 8.9 | 8.7 |
| β-Phenethyl alc. | 29.0 | 28.2 | 28.5 | 27.7 |
| i-Amyl acetate | 22.7 | 21.8 | 22.2 | 21.5 |
| Ethyl Caproate | 2.7 | 2.6 | 2.8 | 2.7 |
| Ethyl Caprylate | 13.9 | 13.1 | 13.4 | 13.0 |
| β-Phenethyl acetate | 13.1 | 13.0 | 13.3 | 13.0 |
| Ethyl Caprate | 46.1 | 41.8 | 42.5 | 41.5 |
| Ethyl Laurate | 40.6 | 33.1 | 34.0 | 33.4 |
| Ethyl Myristate | 7.5 | 4.8 | 4.9 | 4.8 |
| Ethyl Palmitoleate | 17.4 | 13.0 | 13.1 | 13.0 |
| Ethyl Linoleate | 2.0 | 1.4 | 1.4 | 1.4 |
| Acetaldehyde | 24.3 | 27.5 | 27.4 | 26.3 |
| Ethyl acetate | 235.8 | 249.5 | 250.8 | 248.6 |
| Methanol | 25.0 | 26.6 | 26.8 | 27.2 |
| n-Propanol | 233.0 | 251.5 | 252.8 | 249.2 |
| i-Butanol | 545.6 | 588.2 | 591.3 | 582.9 |
| i-Amyl alcohol | 1249.8 | 1348.5 | 1354.2 | 1349.2 |

Example 7

Whiskies on which the liquid-passing treatment was performed by the method in Example 5 ((1) immediately after to 450 hours, (2) 450 to 900 hours, (3) 900 to 1300 hours), and untreated whisky (untreated) were stored in barrels for 6 months. Sensory tests of the whiskies after storage in the barrels were conducted by 9 expert panelists on a scale of 7 with 1 being the lowest and 7 being the highest. The results thereof are shown in Table 7. While an average score of the untreated products was 4.00, the whiskies (1), (2), and (3) had scores of 4.46, 4.67, and 4.54, respectively. All of them had a favorable flavor as compared to the control.

TABLE 7

| | Score (average) | Panelists' comments |
| --- | --- | --- |
| Untreated | 4.00 | Heavy, immature feeling |
| Start time of liquid passing to 450 hours | 4.46 | Sweetness, fullness, vanilla, refreshing |
| 450 to 900 hours | 4.67 | Sweetness, vanilla, woody, mild |
| 900 to 1300 hours | 4.54 | Sweetness, vanilla, woody, richness |

DESCRIPTION OF REFERENCE NUMERALS

1 . . . beverage tank
2 . . . pump
3 . . . cartridge column
4 . . . line
5 . . . filter
6 . . . chamber on inflow port side of beverage
7 . . . chamber on outflow port side of beverage

The invention claimed is:

1. A method for removing an unwanted component included in a beverage, comprising:
   (1) bringing the beverage into contact with a metal-supported zeolite; and
   (2) bringing the beverage, which has been brought into contact with the metal-supported zeolite, into contact with a metal-trapping material, wherein
   [i] the unwanted component is at least one selected from the group consisting of dimethyl disulfide (DMDS) and dimethyl trisulfide (DMTS);
   the unwanted component is removed in both steps (1) and (2);
   the beverage is alcoholic beverages;
   [ii] a metal which constitutes the metal-supported zeolite is silver;
   the amount of silver is 5 to 25 mass % based on a total amount of the metal-supported zeolite;
   [iii] the metal-trapping material is a zeolite having Na+ as an ion-exchangeable cation;
   flavor and aroma components are substantially left in the beverage; and
   [iv] the flavor and aroma components include acetaldehyde; and
   contact with the metal-supported zeolite and the metal-trapping material does not reduce the concentration of acetaldehyde.

2. The method according to claim 1, wherein a zeolite which constitutes the metal-supported zeolite is a Y zeolite or a β zeolite.

3. The method according to claim 1, wherein the zeolite as the metal-trapping material traps metal eluted from the metal-supported zeolite and removes the unwanted component included in the beverage.

4. The method according to claim 1, wherein the flavor and aroma components further include at least one compound selected from the group consisting of:

ethyl lactate, furfural, β-phenethyl alcohol, i-amyl acetate, ethyl caproate, ethyl caprylate, β-phenethyl acetate, ethyl caprate, ethyl laurate, ethyl myristate, ethyl palmitoleate and ethyl linoleate.

5. The method according to claim 1, wherein the alcoholic beverages are distilled alcoholic beverages.

6. The method according to claim 1, wherein the alcoholic beverages is whisky.

7. The method according to claim 1, wherein the zeolite as metal trapping material is Y-type zeolite having $Na^+$ as an ion exchangeable cation.

8. The method according to claim 1, wherein the amount of the zeolite having $Na^+$ as an ion-exchangeable cation in step (2) is 0.3 to 3.0 in a volume ratio based on the metal-supported zeolite.

9. The method according to claim 1, wherein the silver is eluted in the alcoholic beverage in step (1) and removed in step (2).

10. The method according to claim 1, wherein the silver concentration after step (1) is 2.9 to 13 ppm.

11. The method according to claim 1, wherein the silver concentration after step (2) is less than 0.01 ppm.

* * * * *